(12) United States Patent
Magata et al.

(10) Patent No.: US 7,713,015 B2
(45) Date of Patent: May 11, 2010

(54) BOOKBINDING APPARATUS AND IMAGE FORMING SYSTEM

(75) Inventors: Shoko Magata, Toride (JP); Takeshi Aoyama, Abiko (JP); Masahiro Funakoshi, Toride (JP); Yuichi Yamamoto, Toride (JP); Daijiro Kato, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/855,528

(22) Filed: Sep. 14, 2007

(65) Prior Publication Data

US 2008/0080959 A1    Apr. 3, 2008

(30) Foreign Application Priority Data

Sep. 29, 2006    (JP) .............................. 2006-270050

(51) Int. Cl.
*B42C 13/00* (2006.01)
*B42C 9/00* (2006.01)
*B42C 11/00* (2006.01)
*B42C 5/00* (2006.01)

(52) U.S. Cl. ..................... 412/11; 412/8; 412/9; 412/1; 412/6; 412/37; 412/18; 412/33; 412/902

(58) Field of Classification Search ..................... 112/1; 156/60, 295, 312, 356, 358, 364, 558, 563, 156/566, 578, 908; 270/58; 271/225; 412/8, 412/9, 16, 35, 37; 428/192; *B42C 01/00, B42C 05/00, 09/00; C09J 05/00; G03G 15/00, G03G 15/04*
See application file for complete search history.

(56) References Cited

U.S. PATENT DOCUMENTS

| | | | | |
|---|---|---|---|---|
| 4,394,087 | A * | 7/1983 | Irie et al. ....................... | 399/81 |
| 4,473,425 | A | 9/1984 | Baughman et al. .......... | 156/356 |
| 4,540,458 | A | 9/1985 | Baughman et al. .......... | 156/312 |
| 2005/0249574 | A1* | 11/2005 | Honmochi et al. ............. | 412/9 |
| 2007/0212199 | A1* | 9/2007 | Sasamoto ...................... | 412/9 |

* cited by examiner

*Primary Examiner*—Dana Ross
*Assistant Examiner*—Justin V Lewis
(74) *Attorney, Agent, or Firm*—Fitzpatrick, Cella, Harper & Scinto

(57) ABSTRACT

Provided is a bookbinding apparatus including: a conveying unit which sequentially conveys sheets; a gluing unit which glues the sheets conveyed by the conveying unit; a stacking unit which sequentially stacks the sheets glued by the gluing unit; a pressurizing unit which pressurizes glued portions of the sheets stacked on the stacking unit; and a control unit which temporarily stops a stacking process carried out by the conveying unit onto the stacking unit and causes the pressurizing unit to execute a pressurizing process on the sheets stacked on the stacking unit when an operation interrupting event occurs during the stacking process.

12 Claims, 9 Drawing Sheets

BOOKBINDING APPARATUS AND IMAGE FORMING SYSTEM

BACKGROUND OF THE INVENTION

1. Field of the Invention

The present invention relates to a bookbinding apparatus and an image forming system which are connected to an image forming apparatus and the like to perform a gluing process on discharged sheets to be bound as a booklet.

2. Description of the Related Art

Up to now, there is devised a sheet post-processing apparatus, for example, a bookbinding apparatus, which performs a gluing process on a predetermined position of sheets (recording sheets), on which images are recorded by an image forming apparatus, to be bound as a booklet by a bookbinding apparatus. For example, U.S. Pat. No. 4,473,425 and U.S. Pat. No. 4,540,458 disclose a bookbinding apparatus which sequentially stacks multiple sheets conveyed from a copying machine to be aligned while gluing the sheets one by one, and pressurizes glued portions of the stacked sheets to form a sheet bundle.

In the bookbinding apparatus disclosed in U.S. Pat. No. 4,473,425 and U.S. Pat. No. 4,540,458, the glued portions of the multiple sheets stacked on a stacking unit are pressurized by a pressurizing bar while holding a sheet positioned on top of the sheets by a holder. In the bookbinding apparatus, in a case where an operation interrupting event such as out of sheet, out of glue, or sheet jamming occurs in a state where the sheets applied with glue are stacked on the stacking unit, it can be considered that a mode of the bookbinding apparatus is shifted to a waiting mode for temporarily stopping a bookbinding process.

However, when the mode is shifted to the waiting mode upon occurring the operating interrupting event such as sheet jamming occurs, glue applied to the sheets stacked on the stacking unit may be dried before the sheets are pressurized. Therefore, there is a fear of causing a problem in that, for example, adhesion between sheets is deteriorated and bookbinding is not properly performed even if the sheets are pressurized after the waiting mode is released.

SUMMARY OF THE INVENTION

The present invention has been made in view of the above-mentioned circumstances, and therefore the present invention provide a bookbinding apparatus and an image forming system, each of which has a structure capable of preventing a problem of, for example, deterioration in adhesion between sheets upon pressurizing the sheets, because glue applied thereto is dried before the sheets are pressurized, even when the sheets are held in a stacked state after the sheets are applied with glue.

According to a first aspect of the present invention, there is provided a bookbinding apparatus including: a conveying unit which sequentially conveys sheets; a gluing unit which glues the sheets conveyed by the conveying unit; a stacking unit which sequentially stacks the sheets glued by the gluing unit; a pressurizing unit which pressurizes glued portions of the sheets stacked on the stacking unit; and a control unit which temporarily stops a stacking process carried out by the conveying unit onto the stacking unit and causes the pressurizing unit to execute a pressurizing process on the sheets stacked on the stacking unit when an operation interrupting event occurs during the stacking process.

According to a second aspect of the present invention, there is provided an image forming system including a bookbinding apparatus and an image forming apparatus, including: an image forming unit which forms an image on a sheet; a conveying unit which sequentially conveys sheets on each of which an image is formed by the image forming unit; a gluing unit which glues the sheets conveyed by the conveying unit; a stacking unit which sequentially stacks the sheets glued by the gluing unit; a pressurizing unit which pressurizes glued portions of the sheets stacked on the stacking unit; and a control unit which temporarily stops a stacking process carried out by the conveying unit onto the stacking unit, and causes the pressurizing unit to execute a pressurizing process on the sheets stacked on the stacking unit when an operation interrupting event occurs during the stacking process.

The term "glue" according to the present invention is broadly used for, for example, chemically produced glue or an adhesive.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Figure 1:
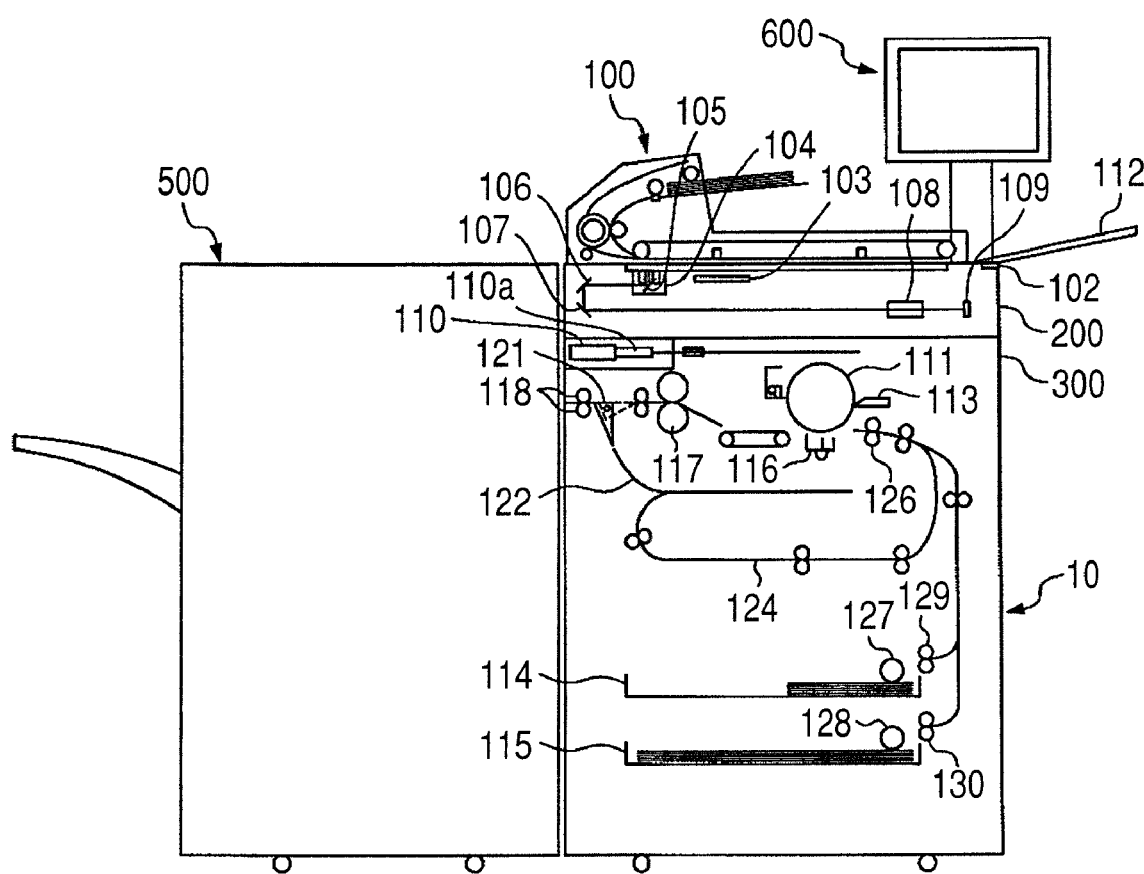
FIG. 1 is an overall block diagram illustrating a longitudinal cross-section structure of a principal part of an image forming apparatus main body to which a corner gluing bookbinding machine according to an embodiment of the present invention is connected.

FIG. 1 is an overall block diagram illustrating a longitudinal cross-section structure of a principal part of an image forming apparatus to which a corner gluing bookbinding machine 500 serving as a bookbinding apparatus according to an embodiment of the present invention is connected. As illustrated in FIG. 1, the image forming apparatus includes an image forming apparatus main body 10 and the corner gluing bookbinding machine 500. The image forming apparatus main body 10 includes an image reader 200 for reading an image of an original, a printer 300 for forming a read image on a recording sheet (sheet), and an operation display device 600.

A specific structure of each component will be described in detail below. The image reader 200 provided to the image forming apparatus main body 10 is mounted with an original feeder 100. The original feeder 100 feeds originals, which are set upward on an original tray, leftward in FIG. 1 one by one in an order from a top sheet of the originals, and conveys the originals from left to right on a platen glass 102 through a curved path, passing through a flow reading position. After that, the originals are discharged to a discharge tray 112 which is provided to an exterior of the image forming apparatus main body. When the originals pass through the flow reading position on the platen glass 102 from left to right, images of the originals are read by a scanner unit 104 which is held at a position corresponding to the flow reading position.

This reading method is generally called an original flow reading method. Specifically, when the original passes through the flow reading position, a reading surface of the original is irradiated with light of a lamp 103 of the scanner unit 104, and reflected light from the original is guided to a lens 108 through mirrors 105, 106, and 107. The light passing through the lens 108 forms an image on an imaging surface of an image sensor 109.

The original is thus conveyed to pass through the flow reading position from left to right, to thereby reading and scanning the original with a direction orthogonal to an original conveying direction being set as a main scanning direction and with the original conveying direction being set as a sub-scanning direction. In other words, when the original passes through the flow reading position, the original is conveyed in the sub-scanning direction while reading the image of the original in the main scanning direction by the image sensor 109 for each line, thereby reading the entire image of the original. The image optically read is converted into image data by the image sensor 109 to be output. The image data output from the image sensor 109 is input as a video signal to an exposure control unit 110 of the printer 300.

In a state where the original is conveyed onto the platen glass 102 by the original feeder 100 to be stopped at a predetermined position, the original can be also read by allowing the scanner unit 104 to scan the original from left to right. This reading method is generally called an original fixed reading method.

When the original is read without using the original feeder 100, the original feeder 100 is lifted up by a user to place an original on the platen glass 102, and the scanner unit 104 is allowed to scan the original from left to right to thereby read the original. Specifically, when the original is read without using the original feeder 100, the original fixed reading is performed.

The exposure control unit 110 of the printer 300 modulates a laser beam in response to the video signal input from the image reader 200 to be output. The laser beam is irradiated on a photosensitive drum 111 while being scanned by a polygon mirror 110a. On the photosensitive drum 111, an electrostatic latent image according to the scanned laser beam is formed. In the case of the original fixed reading, the exposure control unit 110 outputs the laser beam so that a correct image (image which is not mirror image) is formed. The electrostatic latent image formed on the photosensitive drum 111 is visualized as a developer image with a developer supplied from a developing device 113.

Recording sheets fed by pick-up rollers 127 and 128 from an upper cassette 114 or a lower cassette 115 that are mounted in the printer 300 are conveyed to registration rollers 126 by sheet feed rollers 129 and 130. When a leading edge of a recording sheet reaches the registration rollers 126, the registration rollers 126 are driven at an arbitrary timing, and the recording sheet is conveyed between the photosensitive drum 111 and a transferring unit 116 at a given timing in synchronization with start of irradiation of the laser beam.

The developer image formed on the photosensitive drum 111 is transferred onto the fed recording sheet by the transferring unit 116. The recording sheet having the developer image transferred thereon is conveyed to a fixing unit 117. The fixing unit 117 fixes the developer image onto the recording sheet by heating and pressurizing the recording sheet. The recording sheet passing through the fixing unit 117 is discharged from the printer 300 to the exterior of the image forming apparatus main body (corner gluing bookbinding machine 500) through a flapper 121 and discharge rollers 118.

In a case where double-sided recording for performing image formation on both sides of the recording sheet is set, the recording sheet is guided to a sheet surface reverse path 122 through a switching operation of the flapper 121, and is then conveyed to a duplex conveying path 124. Then, control is performed in such a manner that the recording sheet guided to the duplex conveying path 124 is re-fed between the photosensitive drum 111 and the transferring unit 116 at the above-mentioned timing.

The recording sheet discharged from the printer 300 of the image forming apparatus main body 10 is conveyed to the corner gluing bookbinding machine 500.

(Overall System Block Diagram)

Figure 2:
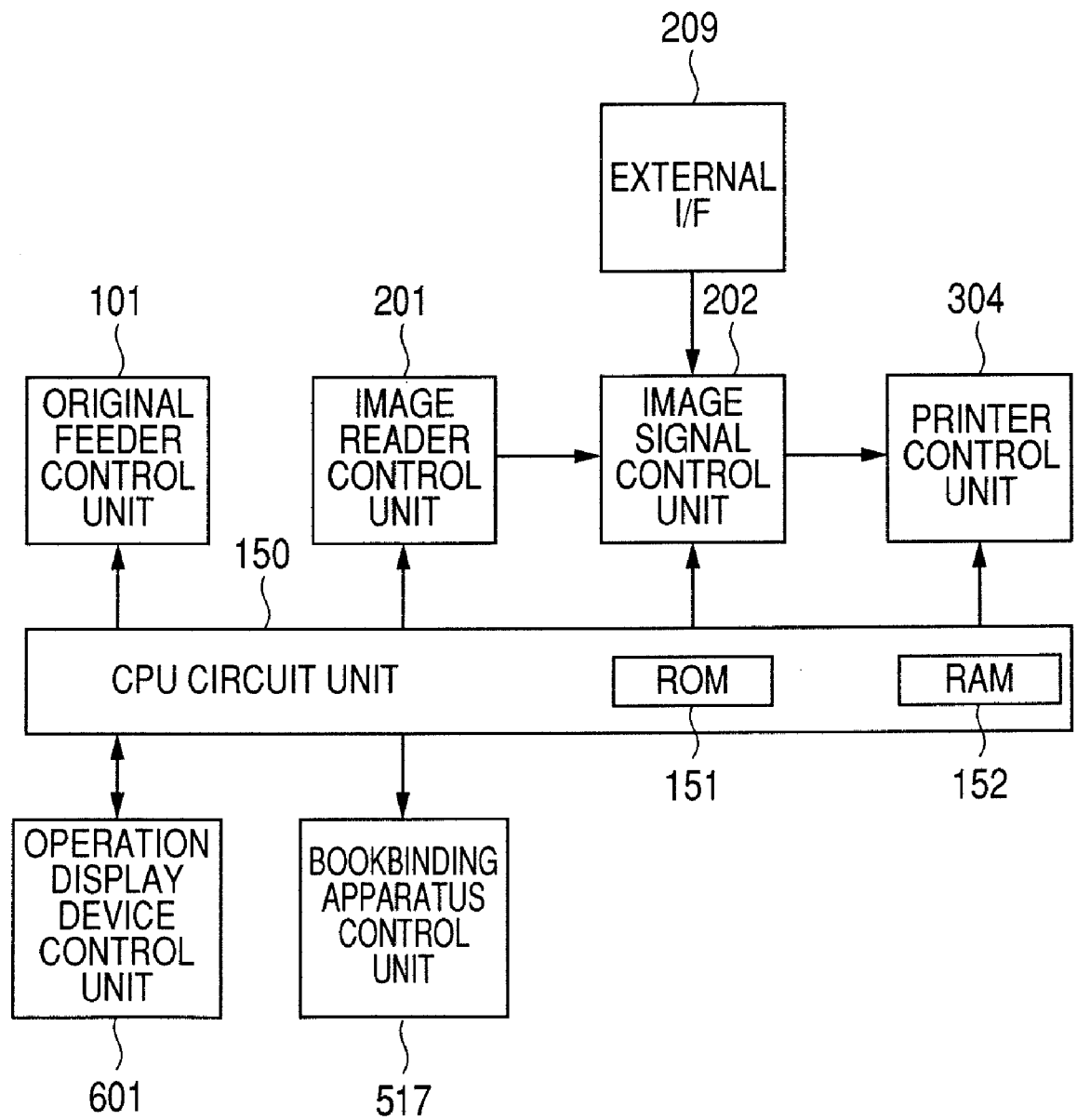
FIG. 2 is a block diagram illustrating a configuration of a controller for controlling the entirety of an image forming system of FIG. 1.

A configuration of a controller for controlling the entire image forming system and the overall system block diagram will be described with reference to FIG. 2. FIG. 2 is a block diagram illustrating the configuration of the controller for controlling the entirety of the image forming system of FIG. 1.

As illustrated in FIG. 2, the controller provided to the image forming apparatus main body 10 includes a CPU circuit unit 150. The CPU circuit unit 150 includes a CPU (not shown), a ROM 151, and a RAM 152 that are built therein. Blocks denoted by reference numerals 101, 201, 202, 209, 304, 601, and 517 are collectively controlled by control programs stored in the ROM 151. The RAM 152 temporarily holds control data and is used as a work area for arithmetic processing in association with the control.

The CPU circuit unit 150 transmits generation of an operation interrupting event on the image forming apparatus main body 10 side, such as out of sheet or out of toner, as a signal for interrupting a bookbinding operation, to a CPU circuit unit 510 of the corner gluing bookbinding machine 500. Upon reception of a signal indicating that an image forming process is to be stopped due to generation of the operation interruption event from the CPU circuit unit 510, the CPU circuit unit 150 interrupts operations of the units relating to the information forming process until the CPU circuit unit 150 receives a signal for releasing interruption of the operation.

The operation interrupting event indicates, for example, out of sheet or out of toner, image adjustment, and temperature control of the fixing device that occur on the image forming apparatus main body 10 side, out of glue occurring on the corner gluing bookbinding machine 500 side, or sheet jamming occurring in the apparatus main body 10 and the bookbinding machine 500.

The original feeder control unit 101 performs drive control of the original feeder 100 in response to an instruction from the CPU circuit unit 150. The image reader control unit 201 performs drive control of the scanner unit 104, the image sensor 109, and the like to transfer an analog image signal output from the image sensor 109 to the image signal control unit 202.

The image signal control unit 202 converts the analog image signal from the image sensor 109 into a digital signal and then performs various processing therefor, and converts the digital signal into a video signal to be output to the printer control unit 304. The image signal control unit 202 performs various processing on the digital image signal input from a computer through an external I/F 209, converts the digital image signal into a video signal, and outputs the video signal to the printer control unit 304. Processing operations carried out by the image signal control unit 202 are controlled by the CPU circuit unit 150. The printer control unit 304 drives the exposure control unit 110 in response to the input video signal.

The bookbinding apparatus control unit 517 collectively controls the units such as a gluing device 520 serving as a gluing unit and a pressurizing device 530 serving as a pressurizing unit which constitutes the corner gluing bookbinding machine 500, in response to the signal from the CPU circuit unit 150.

The operation display device control unit 601 exchanges information between the operation display device 600 and the CPU circuit unit 150. The operation display device 600 includes multiple keys for setting various functions relating to image formation, a display unit for displaying information indicating a setting state. The operation display device 600 outputs a key signal corresponding to an operation of each key to the CPU circuit unit 150, and displays corresponding information on the display unit in response to the signal from the CPU circuit unit 150.

(Configuration of Operation Display Device)

Figure 3:
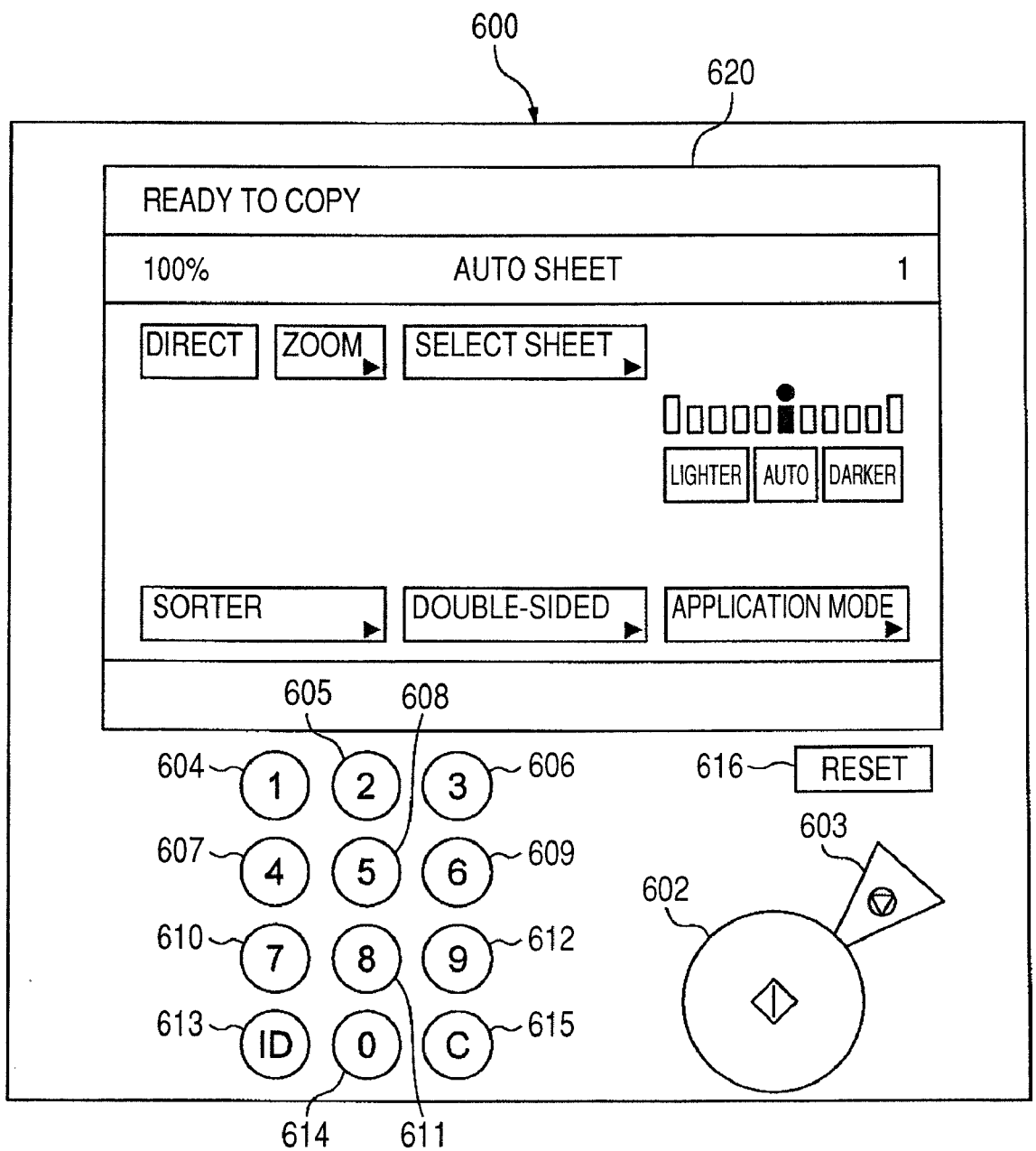
FIG. 3 is a diagram illustrating an operation display unit of the image forming apparatus main body of FIG. 1.

FIG. 3 is a diagram illustrating the operation display device 600 of the image forming apparatus of FIG. 1. As illustrated in FIG. 3, the operation display device 600 includes the following members arranged therein. The operation display device 600 includes a start key 602 for starting an image forming operation, a stop key 603 for interrupting the image forming operation, numeric keys 604 to 612 and 614 for setting numerals or the like, an ID key 613, a clear key 615, and a reset key 616. A liquid crystal display unit 620 having a touch panel formed on an upper portion thereof is arranged in the operation display device 600. Therefore, soft keys can be created on the screen.

For example, the image forming apparatus according to the embodiment has various processing modes such as a normal mode and a bookbinding mode, as a post-processing mode. Setting of the processing modes is performed through an input operation from the operation display device 600.

(Control of Corner Gluing Bookbinding Machine)

Figure 4:
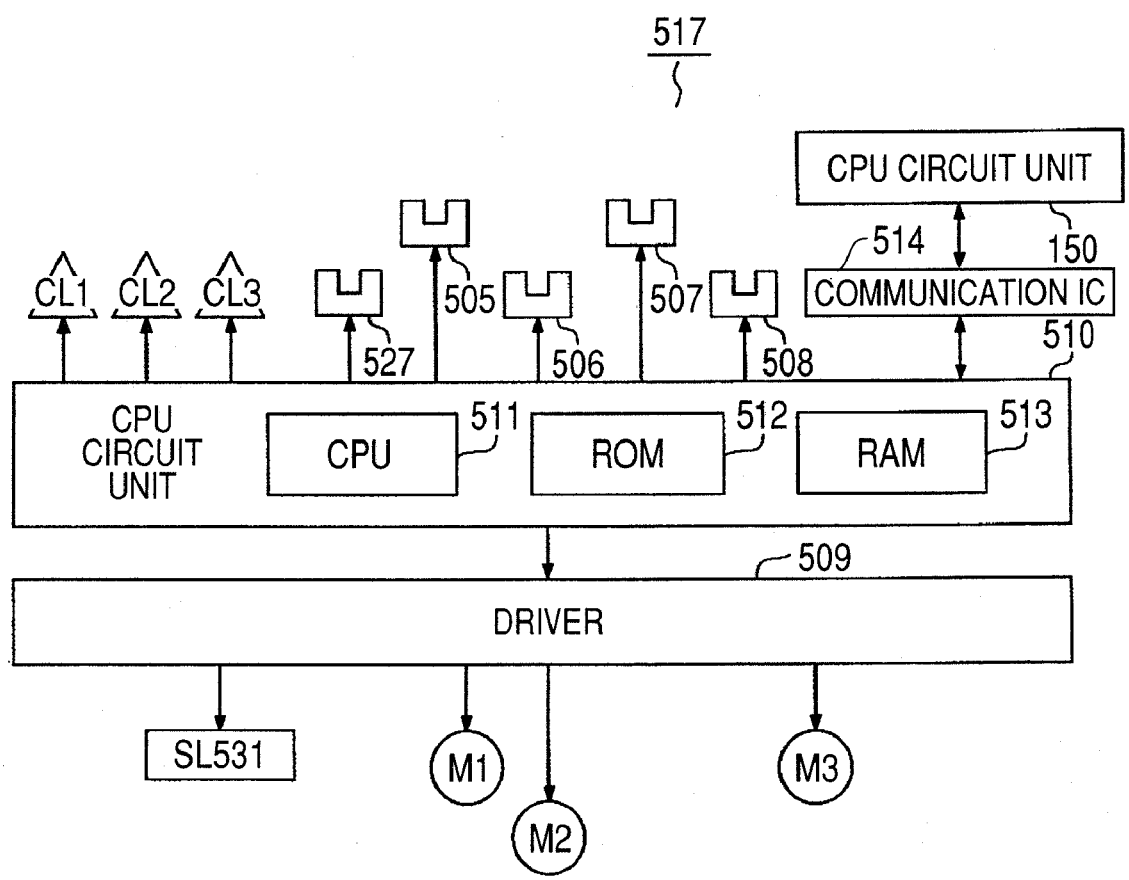
FIG. 4 is a block diagram illustrating a configuration of a bookbinding apparatus controller illustrated in FIG. 2.

A configuration of the bookbinding device control unit 517 for performing drive control of the corner gluing bookbinding machine 500 will be described with reference to FIG. 4. FIG. 4 is a block diagram illustrating the configuration of the bookbinding apparatus control unit 517 of FIG. 2.

As illustrated in FIG. 4, the bookbinding apparatus control unit 517 includes the CPU circuit unit 510 including a CPU 511, a ROM 512, and a RAM 513. The CPU circuit unit 510 communicates with the CPU circuit unit 150, which is provided on the image forming apparatus main body 10 side, through a communication IC 514 to exchange data. The CPU circuit unit 510 executes various programs stored in the ROM 512 in response to an instruction from the CPU circuit unit 150 to perform drive control of the corner gluing bookbinding machine 500.

The CPU circuit unit 510 of the bookbinding apparatus control unit 517 determines whether or not a waiting mode has been set due to generation of the operation interrupting event in the image forming apparatus main body 10 or in the corner gluing bookbinding machine 500. When determining that the waiting mode has been set, the CPU circuit unit 510 performs the following control.

The CPU circuit unit 510 serving as a control unit determines the generation of the operation interrupting event, such as out of sheet or out of toner, occurring on the image forming apparatus main body 10 side, upon reception of a signal for interrupting the bookbinding operation transmitted from the CPU circuit unit 150 of the apparatus main body 10. The CPU circuit unit 510 also determines the generation of the operation interrupting event, such as out of glue, occurring on the corner gluing bookbinding machine 500 side, upon reception of signals from sensors and the like disposed on each unit of the bookbinding machine. When determining that the operation interrupting event has occurred, the CPU circuit unit 510 transmits a signal indicating that the image forming process is to be stopped, to the CPU circuit unit 150 of the image forming apparatus main body 10. When determining that the operation interrupting event has been released, the CPU circuit unit 510 transmits a signal for releasing interruption of the operation, to the CPU circuit unit 150.

Specifically, the CPU circuit unit 510 determines whether or not the operation interrupting event has occurred during the image forming process in the image forming apparatus main body 10, the gluing process carried out by the gluing device 520, and the stacking process carried out through the roller pairs 510 to 504 onto the stacking unit 540. When determining that the operation interrupting event has occurred (waiting mode has been set), the CPU circuit unit 510 temporarily stops the image forming process, the gluing process, and the stacking process until the operation interrupting event is released. When the CPU circuit unit 510 temporarily stops the gluing process and the stacking process, the CPU circuit unit 510 executes the pressurizing process of the pressurizing device 530 on the glued recording sheets stacked on the product stacking unit 540.

When the drive control is performed by the bookbinding apparatus control unit 517, detection signals from various sensors are taken in the CPU circuit unit 510. The various sensors include a reverse inlet sensor 527, a bookbinding inlet sensor 505, a gluing start sensor 506, a gluing stop sensor 507, and a bookbinding outlet sensor 508.

The CPU circuit unit 510 is connected with a driver 509, and the driver 509 drives motors and a solenoid in response to the signal from the CPU circuit unit 510. In addition, the CPU circuit unit 510 drives clutches.

The motors include a sheet feeding/conveying motor M1 which is a drive source for roller pairs 501 and 502, a sheet discharge/conveying motor M2 which is a drive source for roller pairs 503 and 504, and a reverse conveying motor M3 which is a drive source for a roller pair 525. The roller pairs 501, 502, 503, and 504 constitute a conveying unit.

The sheet feeding/conveying motor M1, the discharge/conveying motor M2, and the reverse conveying motor M3 are each formed of a stepping motor, and can rotate, for example, the roller pairs which are driven by the motors at a constant speed through control of an excitation pulse rate.

The solenoid includes a solenoid 531 for operating the pressurizing device 530.

The clutches include a clutch CL1, a clutch CL2, and a clutch CL3. The clutch CL1 transmits a driving force of the sheet feeding/conveying motor M1 to the roller pairs 501 and 502. The clutch CL2 transmits a driving force of the sheet discharge/conveying motor M2 to the roller pairs 503 and 504. The clutch CL3 transmits a driving force of the reverse conveying motor M3 to the roller pair 525.

(Structure of Corner Gluing Bookbinding Machine)

Figure 5:
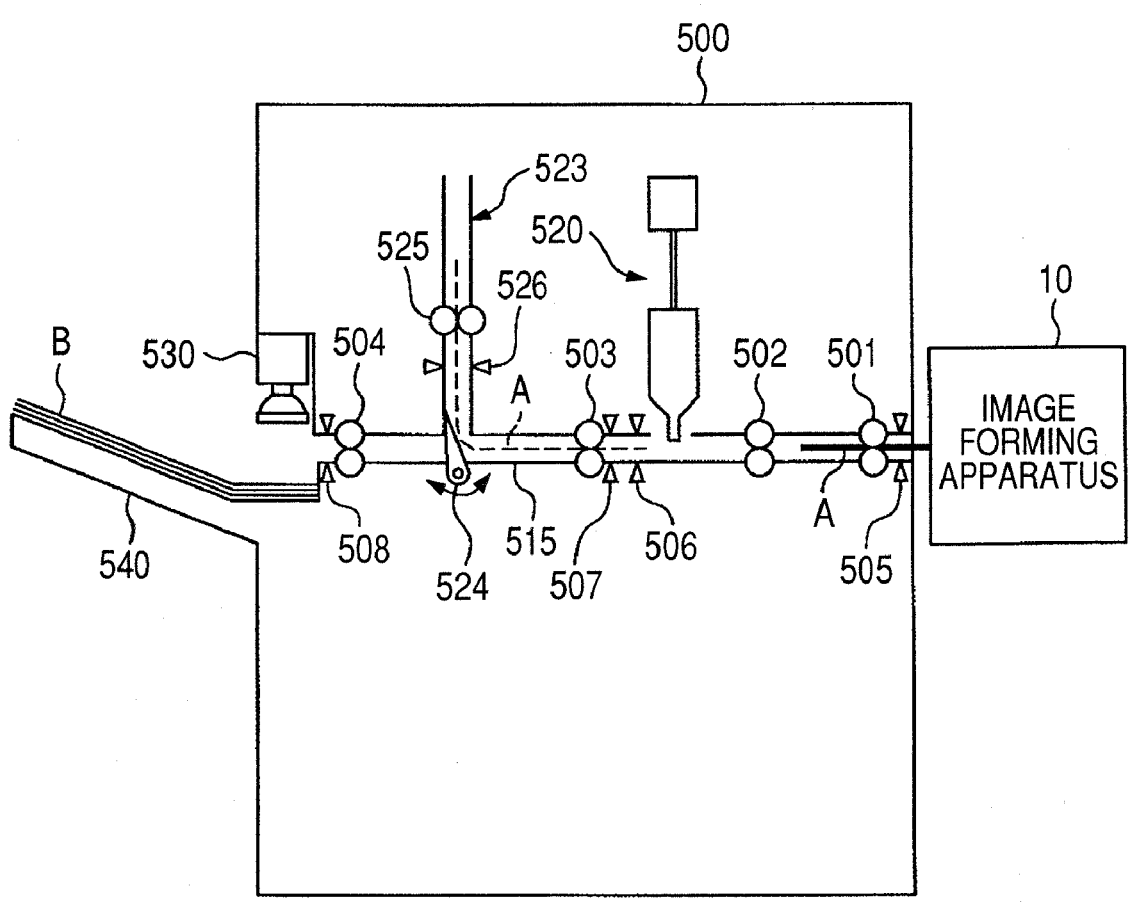
FIG. 5 is a cross-sectional diagram illustrating an internal structure of the corner gluing bookbinding machine according to the embodiment.

FIG. 5 is a cross-sectional diagram of an internal structure of the corner gluing bookbinding machine 500 according to the embodiment. As illustrated in FIG. 5, the corner gluing bookbinding machine 500 includes the gluing device 520, the product stacking unit 540, and the pressurizing device 530. The gluing device 520 is disposed at a substantial center of a recording sheet conveying path provided inside the bookbinding machine. The gluing device 520 is disposed so as to perform the gluing process, as a bookbinding mode, on recording sheets A discharged from the image forming apparatus main body 10, that is, recording sheets which are to be subsequently conveyed through the conveying path by the roller pairs 501 to 504, one by one, at gluing portions on top surfaces of the recording sheets.

The product stacking unit 540 is disposed at a portion at which the recording sheets are discharged through the recording sheet conveying path, and includes a stacking unit for stacking the glued recording sheets A on a stacking surface thereof. The pressurizing device 530 is disposed above the product stacking unit 540 on the bookbinding machine main body side so as to face the stacking unit 540, and pressurizes and adheres the glued portions after the stacking process. The reverse inlet sensor 526 and the roller pair 525 are disposed on the sheet surface reverse path 523 which is positioned upward of and orthogonal to the conveying path on which a leading end of a nozzle of the gluing device 520 and the roller pairs 502 and 503 are positioned. At an intersecting portion between the conveying path and the sheet surface reverse path 523, a reverse switching flapper 524 is disposed.

Figure 6:
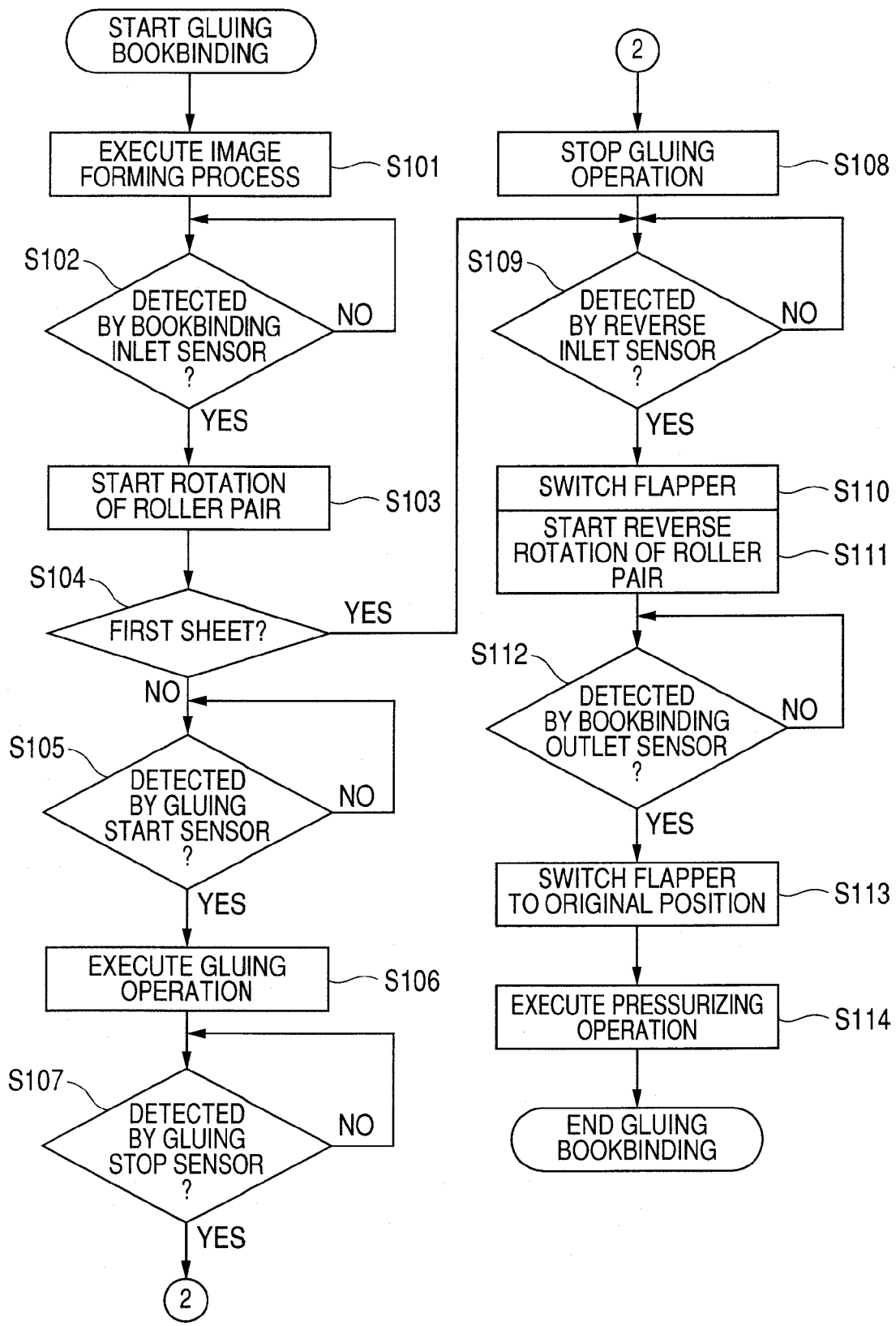
FIG. 6 is a flowchart illustrating a flow of a series of bookbinding operations.
Figure 7A:
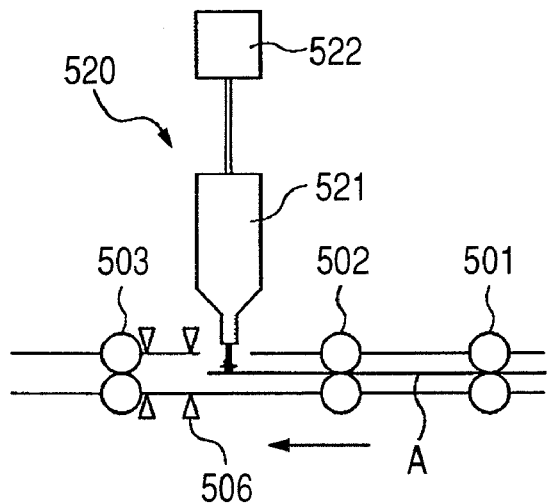
FIGS. 7A, 7B and 7C are cross-sectional diagrams for illustrating stepwise a gluing operation carried out by the corner gluing bookbinding machine according to the embodiment.
Figure 7B:
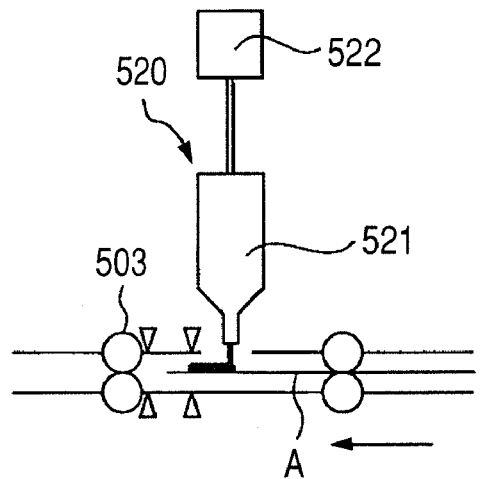
Figure 7C:
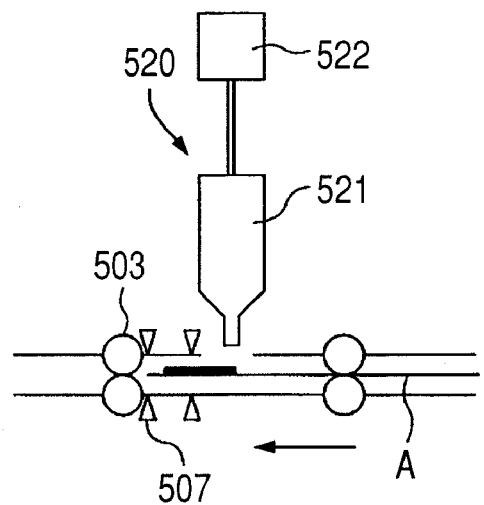

FIG. 6 is a flowchart illustrating a flow of a series of bookbinding operations according to the embodiment. FIGS. 7A to 7C are diagrams each illustrating an outline of the gluing operation carried out by the gluing device 520.

A gluing bookbinding mode is started, and when the bookbinding inlet sensor 505 detects a leading edge of the recording sheet A which has been subjected to the above-mentioned image forming process (S101) and discharged from the image forming apparatus main body 10 (S102), the roller pairs 501 and 502 are rotated (S103). As a result, the recording sheet A is conveyed toward the gluing device 520 (see FIG. 7A). In this case, the recording sheet A is conveyed with a conveying position reference being set on the gluing side (front side).

When the recording sheet A is a first sheet (S104), the recording sheet A merely passes through the gluing device 520 and is directly conveyed to the product stacking unit 540 without being glued.

The gluing device 520 includes a glue ejection nozzle 521 and a nozzle actuator 522. Through an operation of the nozzle actuator 522, glue is ejected from the glue ejection nozzle 521.

With regard to a second sheet and subsequent sheets, when the gluing start sensor 506 detects the leading edge of the recording sheet A (S105), the glue ejection nozzle 521 ejects glue through the operation of the nozzle actuator 522 to apply glue to a corner of the recording sheet A (S106). The recording sheet A is directly conveyed by the roller pair 502 (see FIG. 7B). When the gluing stop sensor 507 detects that the leading edge of the recording sheet A (S107), the nozzle actuator 552 stops the operation to thereby stop ejection of the glue from the glue ejection nozzle 521 (S108) (see FIG. 7C).

When the reverse inlet sensor 526 detects a trailing edge of the recording sheet A (S109), the reverse switching flapper 524 is switched clockwise from a position indicated by the solid line of FIG. 5 (S110), thereby reversely operating the roller pair 525 (S111). As a result, the recording sheet A is conveyed downward of FIG. 5 and is further conveyed toward the product stacking unit 540 by the roller pair 504. Recording sheet bundles B, which have been previously fed, are stacked on the product stacking unit 540, and the recording sheets A are stacked on top of the recording sheet bundles B. The gluing surface of the recording sheet A is reversed by the sheet surface reverse path 523, thereby facing (downward) the top sheet stacked on the product stacking unit 540.

When the bookbinding outlet sensor 508 detects the trailing edge of the recording sheet A (S112), the reverse switching flapper 524 is switched to an original position (position indicated by solid line) (S113). The glued portions (not shown) of the stacked recording sheets A are pressurized by the pressurizing device 530 (S114). Through the pressurization, the glued portions are reliably adhered to each other. The pressurizing device 530 is operated and controlled such that the recording sheets A are pressurized once every time the recording sheet A is stacked on the product stacking unit 540, or every time multiple sheets are stacked thereon.

Description has been given of a series of bookbinding operations according to the bookbinding mode. Alternatively, the corner gluing bookbinding machine 500 according to the embodiment can selectively execute a normal discharge mode without performing the bookbinding process. At the normal discharge mode, the recording sheets discharged from the image forming apparatus main body 10 are merely conveyed by the roller pairs 501 to 504 to be discharged onto the product stacking unit 540.

(Pressurizing Unit for Stacking Unit)

Figure 8A:
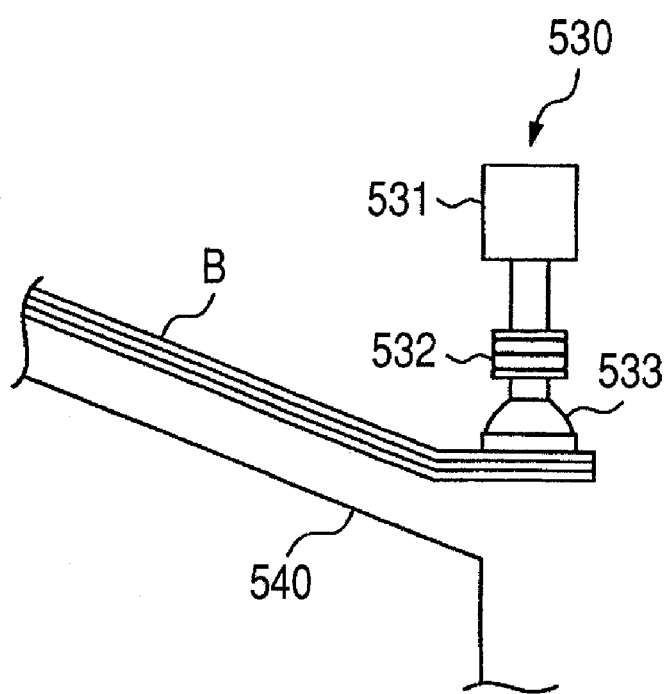
FIGS. 8A and 8B are side views for illustrating an operation of a pressurizing device.
Figure 8B:
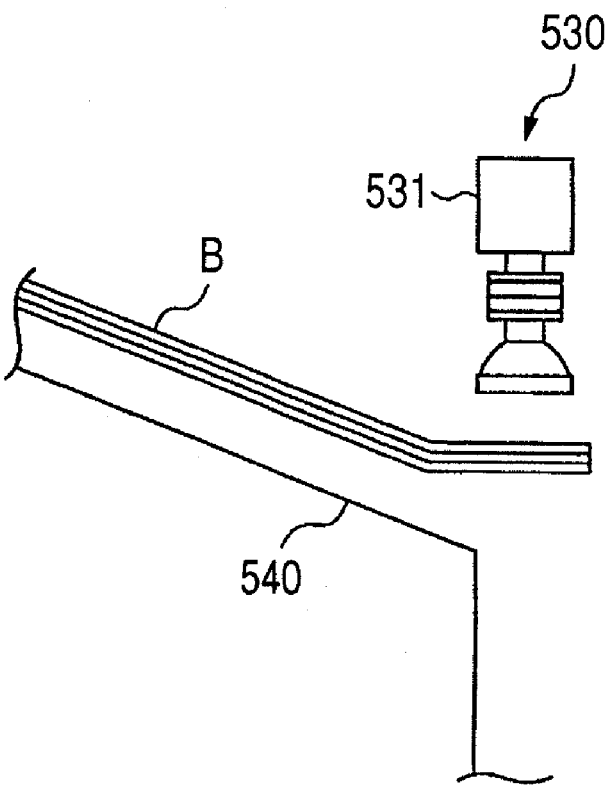

FIGS. 8A and 8B are side views for illustrating the operation of the pressurizing device 530. The recording sheet bundles B stacked on the product stacking unit 540 are pressurized by the pressurizing device 530 every time the recording sheets are stacked one by one on the product stacking unit 540, or every predetermined number of times (per multiple sheets), through operation of the solenoid 531 controlled by the bookbinding apparatus control unit 517. This is because the adhesion is extremely effectively performed before the glue is dried if the pressurization is performed immediately after the gluing process. In addition, through the pressurization, it is possible to prevent a phenomenon in which a difference in adhesion between first stacked recording sheets and subsequently stacked recording sheets is generated depending on a dried condition of the glue, and make an effect of stabilizing the adhesion between sheets.

As illustrated in FIGS. 8A and 8B, the pressurizing device 530 includes a solenoid 531, a pressurizing spring 532, and a pressurizing unit 533. When the recording sheets (recording sheet bundles B) are stacked on the product stacking unit 540, the pressurizing unit 533 descends toward the glued portion which is the corner of the recording sheet through the operation of the solenoid 531, and the glued portion 516 is pressurized by the pressurizing spring 532 (see FIG. 8A). After a predetermined time period has been elapsed, the solenoid 531 is reversely operated and the pressurizing unit 533 ascends to release the pressurization (see FIG. 8B).

Figure 9:
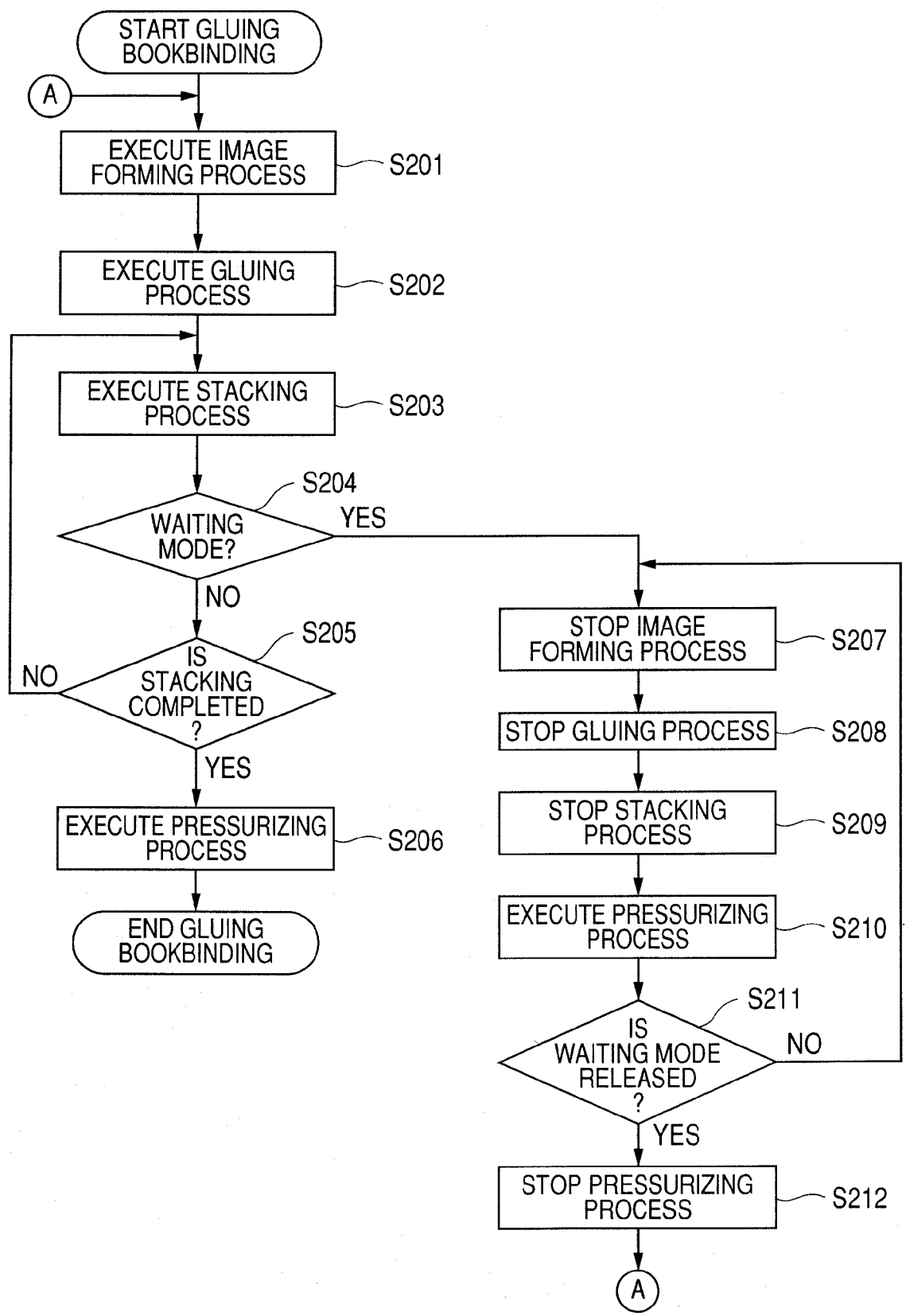
FIG. 9 is a flowchart illustrating a flow of a series of operations in a case of interrupting a gluing bookbinding process to pressurize sheets when an operation interrupting event occurs.

FIG. 9 is a flowchart illustrating a flow of operations in a case where the operation interrupting events such as recording out of sheet or out of glue, sheet jamming, out of toner, image adjustment, or fixing temperature control occurs during the bookbinding mode.

When the gluing bookbinding process is started, in S201, the image forming process for forming an image on the recording sheet A is executed on the image forming apparatus main body 10 side. After that the gluing process for gluing the recording sheets A discharged from the apparatus main body 10 is executed (S202). Subsequently, the glued recording sheets A are reversed by the sheet surface reverse path 523, and then the stacking process for discharging and stacking the glued recording sheets A onto the product stacking unit 540 is executed (S203).

After that, the CPU circuit unit 510 of the bookbinding apparatus control unit 517 determines whether or not the waiting mode has been set due to generation of the operation interrupting event in the image forming apparatus main body 10 or in the corner gluing bookbinding machine 500 (S204). In a case where the waiting mode has not been set, the CPU circuit unit 510 determines whether or not the stacking process for the recording sheets A onto the product stacking unit 540 is finished (S205). In a case where the stacking process for the recording sheets A onto the product stacking unit 540 has not been finished, the CPU circuit unit 510 repeats the processes from S203. In a case where the stacking process for the recording sheets A onto the product stacking unit 540 has been finished in S205, the CPU circuit unit 510 causes the pressurizing device 530 to operate to execute the pressurizing process on the recording sheet bundles B stacked on the product stacking unit 540 (S206), and completes the gluing bookbinding process.

When determining that the waiting mode has been set (S204), the CPU circuit unit 510 outputs a signal to stop the image forming process in the image forming apparatus main body 10 (S207), and stops the gluing process and the stacking process in the bookbinding machine 500 (S208 and S209). In S210, the CPU circuit unit 510 executes the pressurizing process of the pressurizing device 530 on the glued recording sheets (recording sheet bundles B) stacked on the product stacking unit 540. Further, the CPU circuit unit 510 determines whether or not the waiting mode has been released (the operation interrupting event has been released) (S211). If the waiting mode has not been released, S207 to S210 are repeated, and at a point when it is determined that the waiting mode has been released, the CPU circuit unit 510 stops the pressurizing process (S212), and the process advances to S201.

As described above, according to the embodiment, the recording sheet bundles B are stacked on the product stacking unit 540. However, in a case where the operation interrupting event occurs when a volume of sheets are not yet stacked, the CPU circuit unit 510 stops a series of operations including the image forming process, the gluing process, and the stacking process. Then, the CPU circuit unit 510 executes the pressurizing process on the recording sheet bundles B by the pressurizing device 530. When determining that the waiting mode has been released through, for example, replenishment of glue or sheets, the CPU circuit unit 510 releases the pressurization carried out by the pressurizing device 530. After that, a series of operations are resumed by the image forming apparatus main body 10, the gluing device 520, and the product stacking unit 540. The pressurization is performed every time the mode is shifted to the waiting mode in a state where the recording sheets applied with glue are stacked on the product stacking unit 540. Accordingly, the glue applied to the sheets is not dried because the sheets are not left unpressurized during the waiting mode. As a result, the adhesion between sheets can be constantly stabilized and the reliability of the adhesion of the recording sheet bundle, which has been subjected to bookbinding, can be enhanced.

In the embodiment, the gluing device 520 for ejecting the glue to the recording sheet A by the use of the glue ejection nozzle 521 has been illustrated, but the present invention is not limited thereto. In other words, the following devices, for example, can be used as the gluing device. That is, a device which has a rotary gluing roller provided in a glue container, applies glue to an outer periphery of the rotary gluing roller, and brings the outer periphery of the gluing roller into contact with a recording sheet to perform contact transfer, and a device for transferring glue onto a recording sheet in the same manner as a stamp.

According to the embodiment, the pressurization is performed every time the mode is shifted to the waiting mode in the sate where the sheets applied with glue are stacked on the stacking unit, so the glue is not dried because the sheets are not left unpressurized during the waiting mode. As a result, the adhesion between sheets is constantly stabilized, and the reliability of the adhesion of the sheet bundle, which has been subjected to bookbinding, is enhanced.

The term "glue" described above is broadly used for, for example, chemically produced glue or an adhesive.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-270050 filed Sep. 29, 2006, which is hereby incorporated by reference herein in its entirety.

What is claimed is:

1. A bookbinding apparatus, comprising:
   a conveying unit which conveys a sheet;
   a gluing unit which glues the sheet conveyed by the conveying unit;
   a stacking unit which stacks a plurality of sheets glued by the gluing unit;
   a pressurizing unit which pressurizes glued portions of the plurality of sheets stacked on the stacking unit; and
   a control unit which temporarily stops a stacking process carried out by the stacking unit and causes the pressurizing unit to execute a pressurizing process on the sheets stacked on the stacking unit when an operation interrupting event occurs during the stacking process.

2. A bookbinding apparatus according to claim 1, wherein the operation interrupting event comprises an operation interrupting event occurred by an out of glue in the gluing unit.

3. A bookbinding apparatus according to claim 1, wherein the operation interrupting event comprises an operation interrupting event occurred by a sheet jamming.

4. A bookbinding apparatus according to claim 1, wherein the gluing unit glues sheets discharged from an image forming apparatus.

5. A bookbinding apparatus according to claim 4, wherein the operation interrupting event comprises an operation interrupting event occurred by an image adjustment operation of the image forming apparatus.

6. A bookbinding apparatus according to claim 4, wherein the operation interrupting event comprises an operation interrupting event occurred by an out of sheet in the image forming apparatus.

7. A bookbinding apparatus according to claim 4, wherein the operation interrupting event comprises an operation interrupting event occurred by an out of toner in the image forming apparatus.

8. A bookbinding apparatus according to claim 4, wherein the operation interrupting event comprises an operation interrupting event occurred by an operation of controlling temperature of a fixing device provided in the image forming apparatus.

9. A bookbinding apparatus according to claim 1, wherein the pressurizing unit contacts with a surface of a sheet onto which a glue is not applied by the gluing unit and pressurizes the sheets.

10. A bookbinding apparatus according to claim 1, wherein the control unit temporarily stops a gluing process carried out by the gluing unit when the operation interrupting event occurs.

11. A bookbinding apparatus according to claim 4, wherein the control unit temporarily stops an image forming operation carried out by the image forming apparatus when the operation interrupting event occurs.

12. An image forming system including a bookbinding apparatus and an image forming apparatus, comprising:

an image forming unit which forms an image on a sheet;

a conveying unit which conveys the sheet on which an image is formed by the image forming unit;

a gluing unit which glues sheets conveyed by the conveying unit;

a stacking unit which stacks a plurality of sheets glued by the gluing unit;

a pressurizing unit which pressurizes glued portions of the plurality of sheets stacked on the stacking unit; and a control unit which temporarily stops a stacking process carried out by the stacking unit, and causes the pressurizing unit to execute a pressurizing process on the sheets stacked on the stacking unit when an operation interrupting event occurs during the stacking process.

\* \* \* \* \*